United States Patent
Sun et al.

(10) Patent No.: US 11,144,518 B2
(45) Date of Patent: Oct. 12, 2021

(54) DETECTING DATA MAPPING RELATIONSHIP WITHIN DATABASE SYSTEM AND OPTIMIZING DATA OPERATION

(71) Applicant: International Business Machines Corporation, Armonk, NY (US)

(72) Inventors: ShengYan Sun, Beijing (CN); Xiaobo Wang, Beijing (CN); Peng Hui Jiang, Beijing (CN); Shuo Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/202,140

(22) Filed: Nov. 28, 2018

(65) Prior Publication Data
US 2020/0167324 A1 May 28, 2020

(51) Int. Cl.
*G06F 16/215* (2019.01)
*G06F 17/10* (2006.01)
*G06F 16/27* (2019.01)
*G06F 16/23* (2019.01)

(52) U.S. Cl.
CPC ........ *G06F 16/215* (2019.01); *G06F 16/2365* (2019.01); *G06F 16/278* (2019.01); *G06F 17/10* (2013.01)

(58) Field of Classification Search
CPC .. G06F 16/215; G06F 16/278; G06F 16/2365; G06F 17/10; G06F 16/174; G06F 16/1748; G06F 16/1752
See application file for complete search history.

(56) References Cited

U.S. PATENT DOCUMENTS

| | | | |
|---|---|---|---|
| 6,269,432 B1 | 7/2001 | Smith | |
| 6,530,035 B1 | 3/2003 | Bridge | |
| 7,376,680 B1 * | 5/2008 | Kettler | G06F 16/215 |
| 9,009,112 B2 | 4/2015 | Denuit et al. | |
| 9,311,349 B2 | 4/2016 | Herrnstadt | |
| 2009/0210393 A1 * | 8/2009 | Jensen | G06F 16/437 |
| 2013/0275476 A1 * | 10/2013 | Chandler | G06F 16/24552 |
| | | | 707/825 |
| 2016/0147797 A1 | 5/2016 | Dolph et al. | |
| 2017/0116242 A1 * | 4/2017 | Chavan | G06F 12/0875 |
| 2018/0341642 A1 * | 11/2018 | Akerib | G06N 3/0427 |

OTHER PUBLICATIONS

Decastro-Garcia et al., "On Detecting and Removing Superficial Redundancy in Vector Databases", Hindawi, Mathematical Problems in Engineering, vol. 2018, Article ID 3702808, Published May 24, 2018, <https://doi.org/10.1155/2018/3702808>, 14 pages.

* cited by examiner

*Primary Examiner* — Vaishali Shah
(74) *Attorney, Agent, or Firm* — Monchai Chuaychoo (57) ABSTRACT

Embodiments of the present invention provide systems and methods for detecting data redundancy within a database and optimizing data access operations. The embodiments identify a candidate column to determine the relationship between the candidate column against the remaining columns. The system calculates the vector angles of rows based on candidate column pairs and determines the difference in the angle between the candidate column and the corresponding rows of data in the comparison columns. If the candidate column has a greater angle than the compared column, then the compared column is identified as redundant and is marked for the decluttering process.

17 Claims, 6 Drawing Sheets

| ROW | V1 | V2 | V3 | V4 | VERSION |
|---|---|---|---|---|---|
| | Float | double | Char | Int | 2 |
| | | | | | 2 |
| | | | | | 2 |
| | | Keep in original style | | | 1 |
| | | | | | 1 |

FIG. 4A

| ROW | c1 | c2 | c3 | c4 | VERSION |
|---|---|---|---|---|---|
| | v1 | Expression(v1,v2) | v2 | | 2 |
| | | | | | 2 |
| | | | | | 2 |
| | | Keep in original style | | | 1 |
| | | | | | 1 |

DETECTING DATA MAPPING RELATIONSHIP WITHIN DATABASE SYSTEM AND OPTIMIZING DATA OPERATION

BACKGROUND OF THE INVENTION

The present invention relates generally to the field of database administration, and more particularly to systems and methods for optimizing redundant data in tables of a database.

With the increase of acquisitions between large enterprises and the development of new applications, database and application mergers are becoming more and more common. In some situations, there exist a problem where data stored in a database has a variety of redundant data. Specifically, the redundant data is stored in tables with different data types. These redundant data issues originate from enterprise database systems where applications using the database have a long life-cycle and usually are not properly maintained.

Other causes can originate from data migration where DBAs (database administrators) were not carefully monitoring databases during personnel turnovers (e.g., administrators, etc.) or application changes. The issue of redundant data during a database migration process is further compounded by adding columns to support a variety of different data types for new applications or newer versions of old applications, rather than changing the field type of existing data. The current approach of database cleanup during maintenance or acquisition periods, but with the database size (e.g., data, table, etc.) increased, it is sometimes too much to handle during that particular time frame. Eventually, the increase in size of the database becomes a performance bottleneck that database administration must address.

Further, for very large enterprise databases, it is impractical for successive DBAs or application developers to categorize and eradicate specific data redundancy. The DBAs and application developers are more concerned with assuring the applications they maintain are compatible with the associated databases using the most efficient data types available.

SUMMARY

According to one embodiment of the present invention, a method is provided. The method comprising: identifying a candidate group wherein the candidate group comprises of a candidate column, a first comparison column and a second comparison column, associated with a table of a database; identifying one or more sample rows based on the candidate column, the first comparison column; calculating a first candidate vector angle based on a first row of the one or more sample rows, a first comparison vector angle on the first row of the one or more sample rows associated with the candidate column and the first comparison column, respectively; calculating a second candidate vector angle based on a second row of the one or more sample rows and a second comparison vector angle on the second row of the one or more sample rows associated with the candidate column and the first comparison column, respectively; determining if the first candidate vector angle and the first comparison vector angle are greater than the second candidate vector angle and the second comparison vector angle; and responsive to determining the first candidate vector angle and the first comparison vector angle are greater than the second candidate vector angle and the second comparison vector angle, decluttering the second comparison column.

Another embodiment of the present invention, a computer program product is provided. The computer program product comprising: one or more computer readable storage devices and program instructions stored on the one or more computer readable storage devices, the stored program instructions comprising: program instructions to identify a candidate group wherein the candidate group comprises of a candidate column, a first comparison column and a second comparison column, associated with a table of a database; program instructions to identify one or more sample rows based on the candidate column, the first comparison column; program instructions to calculate a first candidate vector angle based on a first row of the one or more sample rows, a first comparison vector angle on the first row of the one or more sample rows associated with the candidate column and the first comparison column, respectively; program instructions to calculate a second candidate vector angle based on a second row of the one or more sample rows and a second comparison vector angle on the second row of the one or more sample rows associated with the candidate column and the first comparison column, respectively; program instructions to determine if the first candidate vector angle and the first comparison vector angle are greater than the second candidate vector angle and the second comparison vector angle; and program instructions to responsive to determine the first candidate vector angle and the first comparison vector angle are greater than the second candidate vector angle and the second comparison vector angle, program instructions to declutter the second comparison column.

According to another embodiment of the present invention, a computer system is provided. The computer system comprising: one or more computer processors; one or more computer readable storage devices; program instructions to identify a candidate group wherein the candidate group comprises of a candidate column, a first comparison column and a second comparison column, associated with a table of a database; program instructions to identify one or more sample rows based on the candidate column, the first comparison column; program instructions to calculate a first candidate vector angle based on a first row of the one or more sample rows, a first comparison vector angle on the first row of the one or more sample rows associated with the candidate column and the first comparison column, respectively; program instructions to calculate a second candidate vector angle based on a second row of the one or more sample rows and a second comparison vector angle on the second row of the one or more sample rows associated with the candidate column and the first comparison column, respectively; program instructions to determine if the first candidate vector angle and the first comparison vector angle are greater than the second candidate vector angle and the second comparison vector angle; and program instructions to responsive to determine the first candidate vector angle and the first comparison vector angle are greater than the second candidate vector angle and the second comparison vector angle, program instructions to declutter the second comparison column.

DETAILED DESCRIPTION

Embodiments of the present invention recognize the need to reduce data clutter in databases. This disclosure provides an approach of determining data mapping relationships within a database system. After determining the mapping relationship, the approach can de-clutter the database and then restructure the database system. The approach is operationally transparent without interrupting data retrieval by existing applications. The existing applications can continue unrestricted data access with the database while reducing the size of the database. For example, existing applications can access a data based on the application required datatype (e.g., character, variable character, text, integer, etc.) while embodiments remove redundant data types no longer necessary for application execution. It is noted that the conversion logic (i.e., de-cluttering, normalization, etc.) can reside in the database layer. Accordingly, applicants do not require the addition of complex conversion logic. Furthermore, the cache of the database can be reduced, avoiding unnecessary page in/page out logic and improving database system performance.

One use case is illustrated as follows. For example, Table 1 has "USA" stored as VARCHAR (holds a variable length string) and Table 2 has the same data, "USA", stored as CHAR (hold a fixed length string). Similarly, Table 3 has "USA" stored as TEXT (holds a string with a maximum length of 65,535 bytes of data). Thus, the data "USA" is stored in three different locations as three different data types. However, applications accessing "USA" only use the "USA" stored as CHAR from Table 2. The approach of the embodiments described herein analyzes the relationship of the same data stored as different data types (i.e., as redundant data) and de-clutters tables of redundant data (e.g., removes "USA" from Table 1 and Table 3).

The approach of determining data mapping relationships in the database relies on principal component analysis (PCA). PCA can use vector-based analysis and sampling methodology to identify redundant data records in data tables. The discussion of vector-based analysis will be covered in greater detail in the discussion of FIG. 3A and FIG. 3B.

Detailed description of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

The term, "normalization", "normalize" or "declutter", as used herein, refers to removing redundant data after being identified by vector analysis methodology. The term is not used in the traditional database sense. For example, in the traditional database definition, "normalization" means the process of restructuring a relational database in accordance with a series of "normal forms" (e.g., first normal, second normal, etc.) in order to reduce data redundancy and improve data integrity.

Figure 1A:
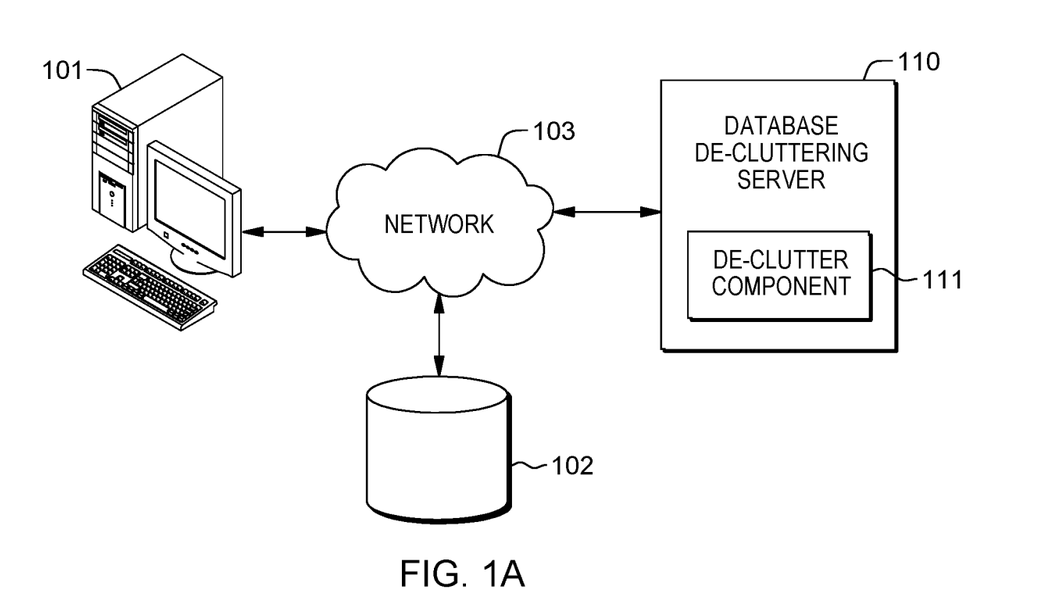
FIG. 1A is a functional block diagram illustrating a database de-clutter environment 100A, in accordance with an embodiment of the present invention.

FIG. 1A is a functional block diagram illustrating the database de-cluttering environment, designated as 100A, in accordance with an embodiment of the present invention. FIG. 1A provides only an illustration of one implementation and does not imply any limitations with regard to the environments in which different embodiments may be implemented. Many modifications to the depicted environment may be made by those skilled in the art without departing from the scope of the invention as recited by the claims.

Database de-cluttering environment 100A includes client computer 101, database 102 and server computer 110, all interconnected over network 103.

Client computer 101 can be any electronic device or computing system capable of receiving, sending, and processing data. Client computer 101 allows the users (e.g., customers) to access database services (or any other suitable applications) on server computer 110 and database 102.

Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between database de-cluttering server 110, database 102 and other computing devices (not shown) within database de-cluttering environment 100A.

Server computer 110 can be a standalone computing device, a management server, a web server, a mobile computing device, or any other electronic device or computing system capable of receiving, sending, and processing data. In other embodiments, server computer 110 can represent a server computing system utilizing multiple computers as a server system, such as in a cloud computing environment. In another embodiment, server computer 110 can be a laptop computer, a tablet computer, a netbook computer, a personal computer (PC), a desktop computer, a personal digital assistant (PDA), a smart phone, or any other programmable electronic device capable of communicating other computing devices (not shown) within 100A via network 103. In another embodiment, server computer 110 represents a computing system utilizing clustered computers and components (e.g., database server computers, application server computers, etc.) that act as a single pool of seamless resources when accessed within database de-cluttering environment 100A. Server computer 110 includes de-clutter component 111.

Database 102 can be a repository for data used by de-clutter component 111. Database 102 can be implemented with any type of storage device capable of storing data and configuration files that can be accessed and utilized by database de-clutter component 111, such as, but not limited to, a database server, a hard disk drive, or a flash memory. Database 102 can use one or more of a plurality of techniques known in the art (e.g., flat files, relational database, etc.) to store a plurality of information. In the depicted embodiment, database 102 can be connected to network 103, server computer 110 and client computer 101. In another embodiment, database 102 can reside on server computer 110.

Figure 3A:
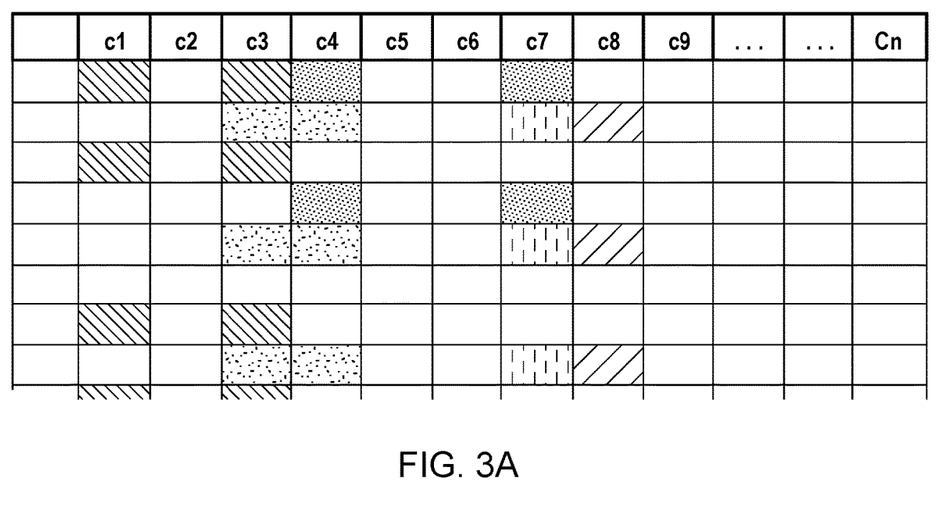
FIG. 3A is an example of a database table during the initial vector angle comparison of columns of the database table, in accordance with an embodiment of the present invention.
Figure 3B:
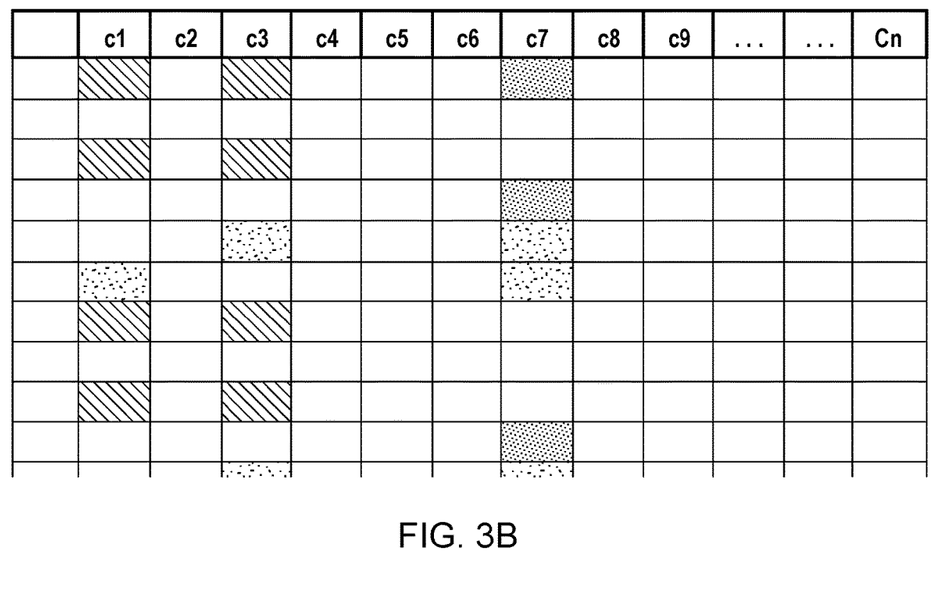
FIG. 3B is an example of a database table after a data record comparison process for removing redundant records of the database table, in accordance with an embodiment of the present invention.
Figure 3C:
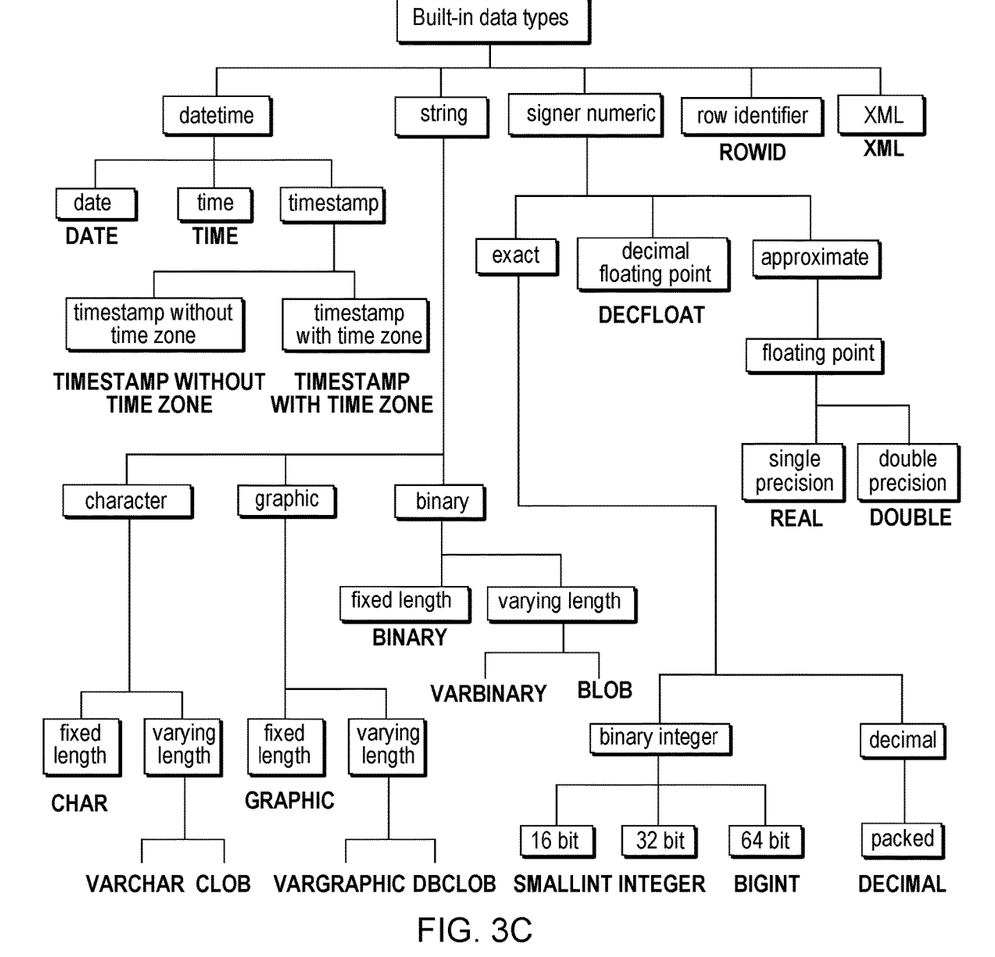
FIG. 3C is an example of data types found in an IBM DB2™ database system, in accordance with an embodiment of the present invention.

De-clutter component 111 provides the capability of analyzing a database and determining a relationship between columns and records (i.e., stored redundant data) in database tables (e.g., database 116, etc.). After analyzing the database tables, de-clutter component 111 can restructure (e.g., de-clutter, normalize, etc.) the redundant data within a table to ensure applications can access the data in the required format. De-clutter component 111 can use a sampling methodology based on either analyzing a portion of a table or analyzing the entire table. The sampling methodology, based on vector analysis for each record, can be further illustrated by an algorithm, $$Rs_b{}^a = \Sigma p1, p2, ps, po$$

where p1 is defined as columns having a relationship with each other. For example, if a database contained two data columns with the same index and those two columns use the same SQL statement, then de-clutter component 111 can identify those two columns as having similar business usage (i.e., records retrieved by the same application). By evaluating the business usage, it is possible to use some ranked values to show the relationship between the two columns. For example, user can identify one column as the candidate column and give that column a ranked value of 10. And the user can identify other columns with similar records as the candidate column with ranked value of 8. Further, the user can identify non-similar columns to the candidate column with a rank of 1. However, if the two columns do not have any relationship in the database catalog tables or SQL statements, then the de-clutter component 111 can ignore from being used in p1. And where ps defines similarity model between each potential data type. For example, ps can refer to DB2™ data type relationship (see FIG. 3C) and the potential transformation of those data types. And where po is the sampling method to go to each object tables (i.e., sampling the candidate columns) and to get an approximate group with a vector method. And where p2 means to monitor the database traffic for a pre-determine time (dynamically adjustable by the user) then split and drill down to activities/table object/fields. For example, referring to p2, splitting/parse the selected SQL statement (after monitoring database traffic) into individual constituents: verb portion (e.g., SELECT, UPDATE, DELETE, etc.), object portion (e.g., table/function/procedure, name, etc.), and fields (e.g., columns/parameters, etc.). After parsing out the SQL statement, program uses the information to calculate from p1 to identify the candidate column group.

Figure 1B:
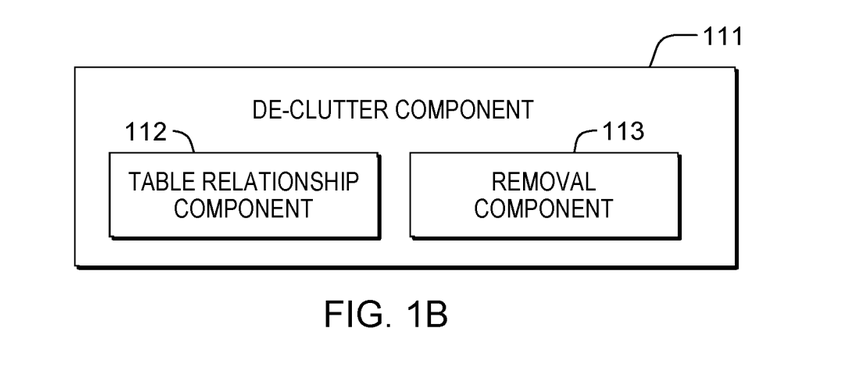
FIG. 1B is a functional block diagram illustrating the individual components of de-clutter component 111 residing in the database de-clutter environment, in accordance with an embodiment of the present invention.

FIG. 1B is a functional block diagram illustrating individual components of de-clutter component 111 residing in database de-cluttering environment 100A, in accordance with an embodiment of the present invention. De-clutter component 111 includes table relationship component 112 and removal component 113.

Table relationship component 112 provides the capability of determining data mapping relationships between the data stored in each record of the columns. Table relationship component 112 calculates vector angles for each candidate column (i.e., the target column for comparison) against other columns to determine if the two columns are redundant. Table relationship component 112 applies a cosine similarity technique to perform the vector angle calculation. The cosine of two non-zero vectors can be derived using the well-known Euclidean dot product formula. Typically, the candidate column can be the column identified previously as the data target of a parsed out recent SQL statement executed by the current application. It is noted that the user can adjust the parameters of de-clutter component 111 to identify the relationship of all columns in the table against the candidate column instead of comparing a portion of the columns in the table against the candidate column). However, depending on system resources, such as, but not limited to, processor speed and system memory, it can be preferred to perform the comparison on a few columns at a time.

Removal component 113 provides the capability of removing redundant data types identified by table relationship component 112. It is noted there are well known methods in the art for normalizing data structures. The first method disclosed removes all the data records from the identified column (see Table 4).

Another alternative method for selecting columns is based on the following algorithm:

$$Rn_{(a,j)}{}^1 = Rr_b{}^a \Sigma p1, p2, ps, po, pp$$

where pp is the performance parameter for transformation between each potential data type. For example, after a period of database monitoring for performance gain, pp can be used as another factor after identify candidate columns for normalization. Even if the angles between the pair of compared columns are greater than each other, it may not make sense to remove the columns if performance gain is negligible or counter-productive (i.e., low pp value). Variables a and j signify that when performing comparison between vector calculation, use a as the starting candidate column and j as the ending column for comparison. For example, a candidate column group consists of c1, c2, c4, c7 and c8 (referring to FIG. 3A and FIG. 3B). Thus, a would equal to c1 (starting column) and j would equal to c8 (ending column). Furthermore, (referring to variable a, j and numerical value of 1 from $Rn_{(a,j)}{}^1$) means to compare each pair of column against the "corner" mark (beginning column) one by one, where 1 indicates how many iteration (e.g., one-by-one, two-by-two, etc.). In an alternative embodiment, this method can allow restructuring table with precision link instead of using real data columns. The term, "precision link", as used herein refers to a placeholder after choosing the column group to perform data normalization. After selecting the candidate columns (i.e., identifying the columns to perform normalization, the un-selected/un-identified column uses a "precision link" instead of real values. The "precision link" includes data type and data precision transformation.

TABLE 4

| Sample Data | | |
|---|---|---|
| C1 | C2 | C3 |
| 1 | 2 | 2 |
| 2 | 3 | 4 |
| 3 | 4 | 6 |
| 4 | 5 | 8 |
| 4 | 5 | 20 |
| 4 | 5 | 18 |

Referring to Table 4, first, table relationship component 112 calculates the angle (using cosine similarity) for each row of column pairs C1-C2 and C1-C3. For column pair C1-C2, the relationship angle can be modeled as C1+1=C2. However, for column pair C1-C3, the first four rows have the relationship 2*C1=C3 but the last two rows do not follow this formula. Therefore, C3 can be removed from the candidate group by removal component 113. This "sampling" process can continue through several iterations until the unrelated columns are removed. As mentioned previously, it is possible to perform the entire column check (i.e., across the entire table) without going through several iterations of the sampling process. It is further noted that a sampling cross check can be defined by the following equation:

$$Rr_b^a = \text{sample.random}(Rs_b^a)$$

The term, "sample.random" is defined as choosing a sample data with a random method and then calculating vector angles based on the sample data. It is noted that any programming language technique can be used to perform the "sample.random" function.

Figure 2:
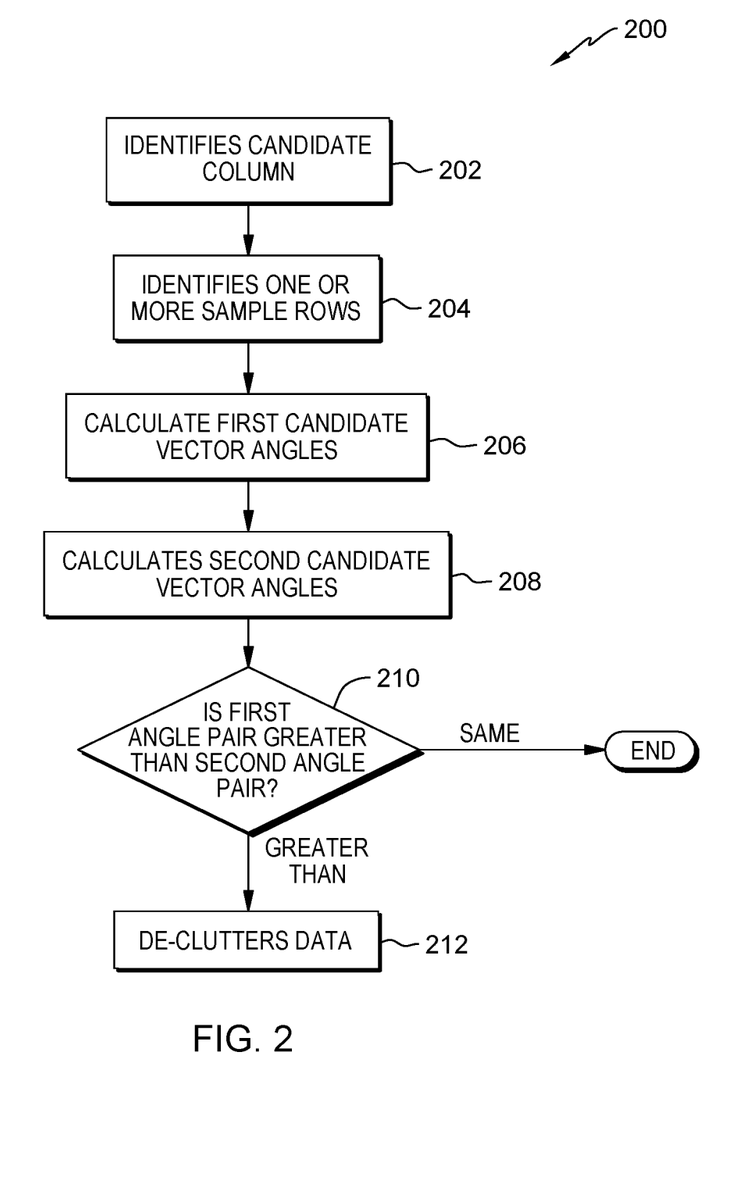
FIG. 2 is a flowchart 200 depicting the operational steps of de-clutter component 111, in accordance with an embodiment of the present invention.

FIG. 2 is a flowchart 200 depicting the operational steps of de-clutter component 111, in accordance with an embodiment of the present invention.

De-clutter component 111 identifies the candidate column from the tables (step 202). In an embodiment, de-clutter component 111 through table relationship component 112, identifies the candidate columns as the "corner" column to compare against other sample columns. The candidate column along with other compared columns are known as the candidate group. Typically, the candidate column can be identified by parsing out SQL statements from existing applications to determine the actual column and/or record being accessed. Further, de-clutter component 111 through table relationship component 112, identifies sample columns for comparison against the candidate column (i.e., corner column). For example (referring to FIGS. 3A and 3B), the candidate column is selected as c1 and the comparisons columns are c2, c4, c7 and c8. In another example, referring to Table 4, the candidate column is c1 and comparison columns are c2 and c3. In an alternative embodiment, it is possible to compare the candidate column against the rest of the columns in the table without sampling a few columns for comparison. For example, instead of comparing c1 to c2 and c7, c1 can be compared to c2 to $c_n$ (where n is the last column of the table).

De-clutter component 111 identifies one or more sample rows (step 204). In an embodiment, de-clutter component 111 identifies one or more sample rows associated with the candidate group. For example, referring to Table 4, the one or more sample rows would be the first row containing the values 1, 2 and 2 corresponding to columns, c1, c2 and c3, respectively.

De-clutter component 111 calculates first candidate vector angles (step 206). In an embodiment, de-clutter component 111 through table relationship component 112, calculates the angle of the vector based on each column and the first row from the prior step, using the technique of cosine similarity to calculate the vector angels. For example, referring to Table 4, de-clutter component 111 would calculate the angle for the first row of c1 vs. c2 and c1 vs. c3.

De-clutter component 111 calculates second candidate vector angles (step 208). In an embodiment, de-clutter component 111 through table relationship component 112, calculates the angle of the vector based on the second row. For example, referring to Table 4, de-clutter component 111 would calculate the angle for the second row of c1 vs. c2 and c1 vs. c3.

De-clutter component 111 determines if the vector angles from the first pair is greater than the second pair (decision block 210). In an embodiment, de-clutter component 111 determines whether the first pair of columns (c1, c2 and c3) based on the record of first row has a greater vector angle than the records based on the second row of the same columns. If the first pair does have a greater angle ("GREATER THAN" branch, decision block 210) then de-clutter component 111 can proceed to normalize the second pair of columns (step 210). For example, referring to Table 4, the data from first and second rows for the column pairs of c1 vs c2 and c1 vs c3 are very similar (same angle) and therefore, would not need to be normalized. However, looking at the fifth and sixth row for c1, c2 and c3, it is clear that the data in c3 is drastically different than c1 and c2. Therefore, when comparing c1 vs c2 and c1 vs c3 using the data from fifth and sixth column, the vector angle of c3 against c1 and c2 will be much higher. Therefore, column c3 would need to be normalized.

If the first pair does not have a greater angle ("SAME" branch, decision block 210) then de-clutter component 111 does not need to normalize between the two column pairs and can stop.

De-clutter component 111 proceeds to de-clutter the selected column(s) (step 212). In an embodiment, de-clutter component 111 through removal component 113 de-clutters the comparison columns. For example, referring to Table 4, removal component 113 would remove column c3 from the candidate group.

In an alternative embodiment, de-clutter component 111 can repeat step 204 and proceed to compare the next rows and/or columns until there are no comparison columns and/or rows left.

FIG. 3A is an example of a database table during the initial vector angle comparison of the columns, in accordance with an embodiment of the present invention. Columns of records being compared are labeled as c1, c3, c4, c7 and c8. The contents of those records are compared according to the following permutation: c1 vs. c3, c1 vs. c4, c1 vs. c7, c1 vs. c8, c3 vs. c4, c3 vs. c7, c3 vs. c8, c7 vs. c8. Some records have been purposely shaded to illustrate either a same angle or a different angle (i.e., greater than) from each column.

FIG. 3B is an example of the database table from FIG. 3A after the data columns comparison process and removing redundant records, in accordance with an embodiment of the present invention. The greater the vector angle between the columns (e.g., c1 vs. c3, c1 vs. c4, c1 vs. c7, c1 vs. c8, c3 vs. c4, c3 vs. c7, c3 vs. c8, c7 vs. c8, etc.), the more likely the data is similar. For example, the shading for c1 and c3 are the same which means that their vector angles are similar and cannot be de-clutter since their data are not the same. However, if the data in c7 and c8 is similar (i.e., has a greater difference in vector angle than other pairs of columns) then the content of c8 can be normalized (i.e., removed). The process of comparing the angles is repeated for a number of iterations until all redundant data is identified. For example, the second iteration would compare c1, c3 and c7 against each other. The column, c8, is no longer in consideration after the first iteration since it was deemed redundant. It is noted that another parameter can be used to decide if a column is redundant data. For example, referring to this previous equation, $Rn_{(a,j)}^{1}=Rr_{b}^{a}\Sigma p1,p2,ps,po,pp$, where pp refers to performance estimate. Performance estimate (pp) is performed on each pair of records to detect whether by removing or keeping the data record, it would improve or degrade database performance. If the analysis (based on database performance) determines that removing the pair of records would improve data performance then the pair of records would be removed (i.e., referring to FIG. 3B, c3 vs c4 was removed based on performance metric).

FIG. 3C is an example of data types found in IBM DB2™ database system in accordance with an embodiment of the present invention.

Figure 4A:
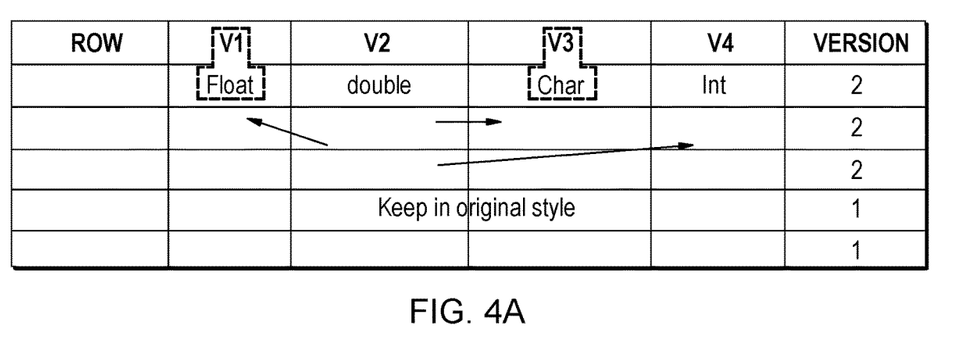
FIG. 4A is an example of a database table after a normalization procedure where each page version is added to keep the original style, in accordance with an embodiment of the present invention.

FIG. 4A is an example of a database table after a normalization procedure where each page version is added to keep the original style in accordance with an alternative embodiment of the present invention. Depending on the application request from the normalized database, the corresponding data type can be returned to the application with precision link (i.e., data type representation) instead of directly returning real data columns. It is noted that using this process (i.e., precision link) would be very advantageous when there is very little to be gained by removing the data based on the fact there is a small difference in data columns. For example, data stored in column V2 as DOUBLE can be used in other data types such as INT (column V4) and FLOAT (column V1) because data stored as DOUBLE has a higher precision, so it can be used for other lower precision data types such as FLOAT and INT. Thus, by doing so, this can eliminate storing the same data as different data types and can use the precision link. Furthermore, data types (e.g., FLOAT, DOUBLE, CHAR, INT) in rows, V1, V2, V3 and V4, respectively, can be rolled back (from version 2) to the original version (version 1) to keep with the original style (i.e., existing application requesting the data) based on the user's data reduction goal.

Figure 4B:
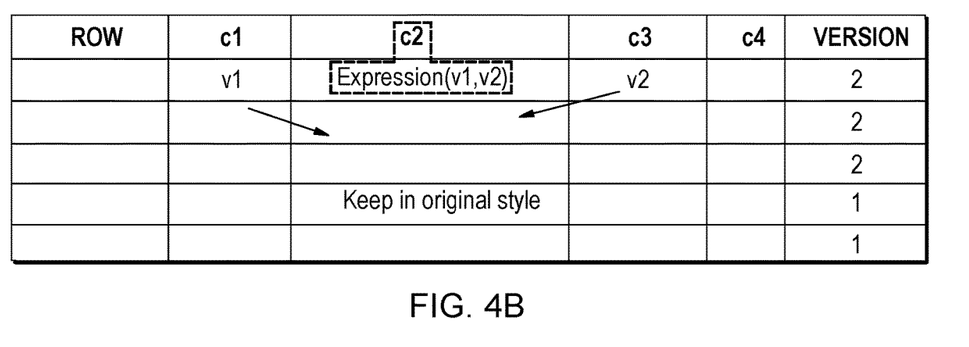
FIG. 4B is an example of a database table after a normalization procedure based on a simple relationship or use define expression to keep the original style, in accordance with an embodiment of the present invention.

FIG. 4B is an example of a database table after a normalization procedure based on simple relationship (or user define expression) to keep the original style in accordance with an alternative embodiment of the present invention. For example, c1 is a column defined as "COUNTRY" and c3 is a column defined as "STATE". The value of c1 is "USA" and value in c3 is "NEW YORK". To keep data less redundant in c1 and c3, it is possible to combine the value of c1 and c3 and store the combined values in c2 (i.e., expression (v1, v2)). Thus, the content of c2 is now "USA NEW YORK." Therefore, there is no need to use columns, c1 and 3 to store data separately (i.e., takes up space).

Figure 5:
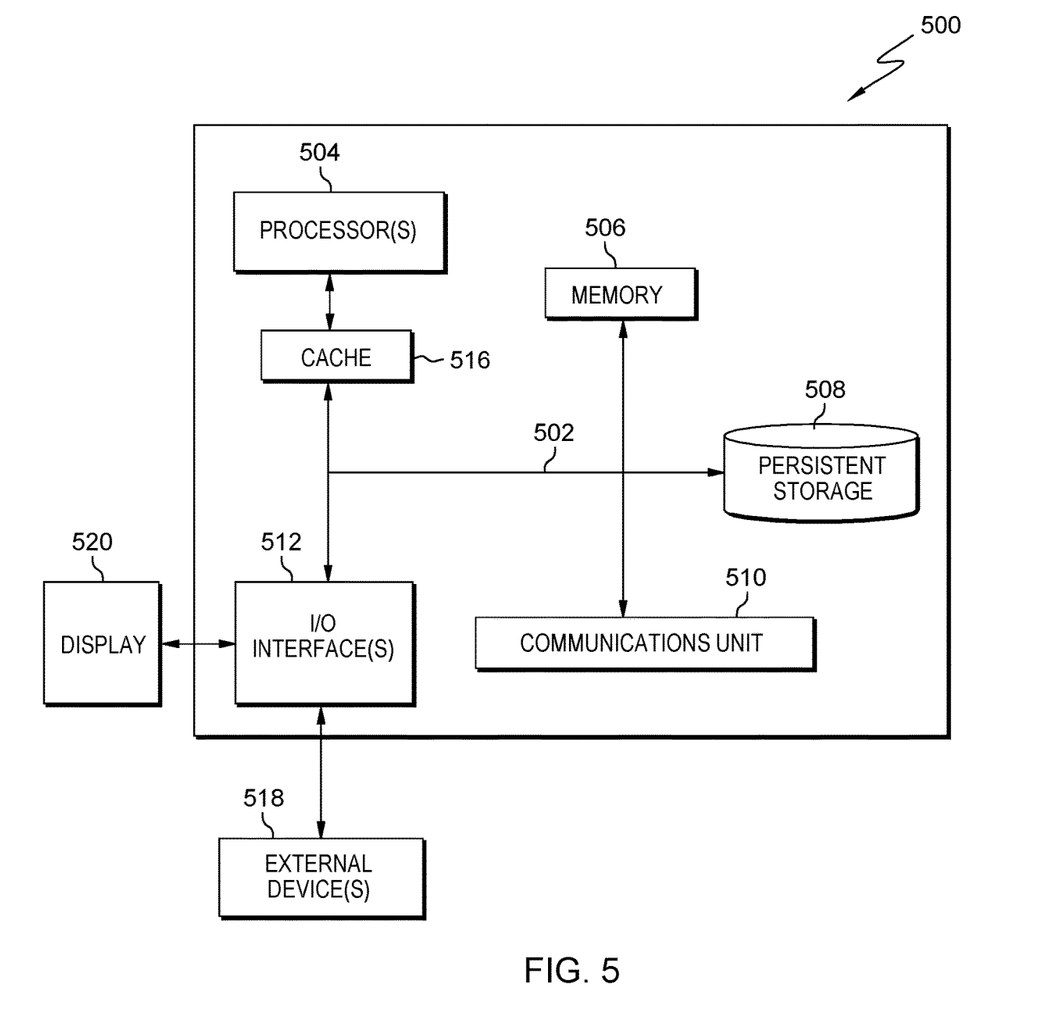
FIG. 5 is a block diagram 500, of components of a server computer capable of executing a de-clutter component 111 within the database de-clutter environment 100A, in accordance with an embodiment of the present invention.

FIG. 5 depicts a block diagram, designated as 500, of components of the server computer executing the program within the travel security monitoring environment, of FIG. 1A, in accordance with an embodiment of the present invention.

Server computer 110 can include processor(s) 504, cache 416, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processor(s) 507 by holding recently accessed data, and data near recently accessed data, from memory 506.

Program instructions and data used to practice embodiments of the present invention, e.g., de-clutter component 111 and database 116, can be stored in persistent storage 508 for execution and/or access by one or more of the respective processor(s) 507 of database de-cluttering server 110 via memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of database 102, database de-cluttering server 110. In these examples, communications unit 510 includes one or more network interface cards. Communications unit 510 may provide communications through the use of either or both physical and wireless communications links. De-clutter component 111 and database 116 may be downloaded to persistent storage 508 of database de-cluttering server 110 through communications unit 510.

I/O interface(s) 512 allows for input and output of data with other devices that may be connected to database de-cluttering server 110. For example, I/O interface(s) 512 may provide a connection to external device(s) 518 such as a keyboard, a keypad, a touch screen, a microphone, a digital camera, and/or some other suitable input device. External device(s) 518 can also include portable computer readable storage media such as, for example, thumb drives, portable optical or magnetic disks, and memory cards. Software and data used to practice embodiments of the present invention, e.g., de-clutter component 111 and database 116 on database de-cluttering server 110, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor or the lenses of a head mounted display. Display 520 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for detecting data redundancy within a database and optimizing data access operations, the method comprising:

identifying a candidate group based on an equation of principal component analysis (PCA) wherein the candidate group comprises of a candidate column, a first comparison column, associated with a table of a database and the equation further comprises:

$$Rs_b{}^a = \Sigma p1, p2, ps, po$$

wherein p1 is to scan catalog table information; p2 is to monitor database traffic of the table, ps define similarity model between each potential data type; po is a sampling method to go through each object tables to get an approximate group with vector method; a is a starting table and b is an ending table;

identifying one or more sample rows based on the candidate column, the first comparison column and based on a predetermined parameter, wherein the predetermined parameter indicates identifying all columns against the candidate column or identifying the one more sample rows against the candidate column;

calculating a first candidate vector angle based on a first row of the one or more sample rows, a first comparison vector angle on the first row of the one or more sample rows associated with the candidate column and the first comparison column, respectively;

calculating a second candidate vector angle based on a second row of the one or more sample rows and a second comparison vector angle on the second row of the one or more sample rows associated with the candidate column and the first comparison column, respectively;

determining if the first candidate vector angle and the first comparison vector angle are greater than the second candidate vector angle and the second comparison vector angle;

responsive to determining the first candidate vector angle and the first comparison vector angle are greater than the second candidate vector angle and the second comparison vector angle, decluttering the first comparison columns;

restructuring the database based on the decluttered first comparison column and any subsequent columns associated with the table of the database, wherein restructuring the database comprises of reduction in size of the database, reduction in size of a cache of the database, and improved performance of the database.

2. The method of claim 1, further comprising:
monitoring the database traffic from the candidate group;
determining whether the database traffic is reduced based the candidate group; and
responsive to determining that the database traffic is reduced, declutter the candidate group.

3. The method of claim 1, wherein declutter the first comparison column further comprises:
removing the data associated with the first comparison column from the database.

4. The method of claim 1, wherein calculating the first candidate vector angle further comprises:
determining the first candidate vector angle by using cosine similarity.

5. The method of claim 2, wherein monitoring the database traffic further comprises:
parsing out SQL statement between an application and the database.

6. The method of claim 5, wherein parsing out SQL statement between the application and the database further comprises:
determining a data column associated with the parsed-out SQL statement; and
assigning the data column to the candidate group.

7. A computer program product for detecting data redundancy within a database and optimizing data access operations, the computer program product comprising:
one or more computer readable non-transitory storage devices and program instructions stored on the one or more computer readable non-transitory storage devices, the stored program instructions comprising:
program instructions to identify a candidate group is based on an equation of principal component analysis (PCA) wherein the candidate group comprises of a candidate column, a first comparison column, associated with a table of a database and the equation further comprises:

$$Rs_b{}^a = \Sigma p1, p2, ps, po$$

wherein p1 is to scan catalog table information; p2 is to monitor database traffic of the table, ps define similarity model between each potential data type; po is a sampling method to go through each object tables to get an approximate group with vector method; a is a starting table and b is an ending table;

program instructions to identify one or more sample rows based on the candidate column, the first comparison column and based on a predetermined parameter, wherein the predetermined parameter indicates identifying all columns against the candidate column or identifying the one more sample rows against the candidate column;

program instructions to calculate a first candidate vector angle based on a first row of the one or more sample rows, a first comparison vector angle on the first row of the one or more sample rows associated with the candidate column and the first comparison column, respectively;

program instructions to calculate a second candidate vector angle based on a second row of the one or more sample rows and a second comparison vector angle on the second row of the one or more sample rows associated with the candidate column and the first comparison column, respectively;

program instructions to determine if the first candidate vector angle and the first comparison vector angle are greater than the second candidate vector angle and the second comparison vector angle; and program instructions to responsive to determine the first candidate vector angle and the first comparison vector angle are greater than the second candidate vector angle and the second comparison vector angle, program instructions to declutter the first comparison column; and program instructions to restructure the database based on the decluttered first comparison column and any subsequent columns associated with the table of the database, wherein restructuring the database comprises of reduction in size of the database, reduction in size of a cache of the database, and improved performance of the database.

8. The computer program product of claim 7, further comprises:
program instructions to the monitor database traffic from the candidate group;
program instructions to determine whether the database traffic is reduced based the candidate group; and
responsive to program instructions to determine that the database traffic is reduced, program instructions to declutter the candidate group.

9. The computer program product of claim 7, wherein program instructions to declutter the first comparison column further comprises:
program instructions to remove the data associated with the first comparison column from the database.

10. The computer program product of claim 7, wherein program instructions to calculate the first candidate vector angle further comprises:
program instructions to determine the first candidate vector angle by using cosine similarity.

11. The computer program product of claim 8, wherein program instructions to monitor the database traffic further comprises:
program instructions to parse out SQL statement between an application and the database.

12. The computer program product of claim 11, wherein program instructions to parse out SQL statement between the application and the database further comprises:
program instructions to parse out SQL statement between the application and the database;
program instructions to determine a data column associated with the parsed-out SQL statement; and
program instructions to assign the data column to the candidate group.

13. A computer system for detecting data redundancy within a database and optimizing data access operations, the computer system comprising:
one or more computer processors;
one or more computer readable non-transitory storage devices; and
program instructions stored on the one or more computer readable non-transitory storage devices for execution by at least one of the one or more computer processors, the stored program instructions comprising:
program instructions to identify a candidate group is based on an equation of principal component analysis (PCA) wherein the candidate group comprises of a candidate column, a first comparison column, associated with a table of a database and the equation further comprises:

$$Rs_b{}^a = \Sigma p1, p2, ps, po$$

wherein p1 is to scan catalog table information; p2 is to monitor database traffic of the table, ps define similarity model between each potential data type; po is a sampling method to go through each object tables to get an approximate group with vector method; a is a starting table and b is an ending table;

program instructions to identify one or more sample rows based on the candidate column, the first comparison column and based on a predetermined parameter, wherein the predetermined parameter indicates identifying all columns against the candidate column or identifying the one more sample rows against the candidate column;

program instructions to calculate a first candidate vector angle based on a first row of the one or more sample rows, a first comparison vector angle on the first row of the one or more sample rows associated with the candidate column and the first comparison column, respectively;

program instructions to calculate a second candidate vector angle based on a second row of the one or more sample rows and a second comparison vector angle on the second row of the one or more sample rows associated with the candidate column and the first comparison column, respectively;

program instructions to determine if the first candidate vector angle and the first comparison vector angle are greater than the second candidate vector angle and the second comparison vector angle; and program instructions to responsive to determine the first candidate vector angle and the first comparison vector angle are greater than the second candidate vector angle and the second comparison vector angle, program instructions to declutter the first comparison column; and program instructions to restructure the database based on the decluttered first comparison column and any subsequent columns associated with the table of the database, wherein restructuring the database comprises of reduction in size of the database, reduction in size of a cache of the database, and improved performance of the database.

14. The computer system of claim 13, further comprises:
program instructions to monitor the database traffic from the candidate group;
program instructions to determine whether the database traffic is reduced based the candidate group; and
responsive to program instructions to determine that the database traffic is reduced, program instructions to declutter the candidate group.

15. The computer system of claim 13, wherein program instructions to declutter the first comparison column further comprises:
program instructions to remove the data associated with the first comparison column from the database.

16. The computer system of claim 13, wherein program instructions to calculate the first candidate vector angle further comprises:
program instructions to determine the first candidate vector angle by using cosine similarity.

17. The computer system of claim 14, wherein program instructions to monitor the database traffic further comprises:
program instructions to parse out SQL statement between an application and the database wherein program instructions to parse out SQL statement between the application and the database further comprises:
program instructions to determine a data column associated with the parsed-out SQL statement; and
program instructions to assign the data column to the candidate group.

\* \* \* \* \*